US011868241B1

(12) United States Patent
Kinderman et al.

(10) Patent No.: US 11,868,241 B1
(45) Date of Patent: Jan. 9, 2024

(54) METHOD AND SYSTEM FOR OPTIMIZING A VERIFICATION TEST REGRESSION

(71) Applicant: Cadence Design Systems, Inc., San Jose, CA (US)

(72) Inventors: Yael Kinderman, Givat Shmuel (IL); Yosinori Watanabe, Lafayette, CA (US); Michele Petracca, Chappaqua, NY (US); Ido Avraham, Netanya (IL)

(73) Assignee: Cadence Design Systems, Inc., San Jose, CA (US)

( * ) Notice: Subject to any disclaimer, the term of this patent is extended or adjusted under 35 U.S.C. 154(b) by 450 days.

(21) Appl. No.: 16/708,597

(22) Filed: Dec. 10, 2019

(51) Int. Cl.
*G06F 11/36* (2006.01)
*G06N 20/00* (2019.01)

(52) U.S. Cl.
CPC ...... *G06F 11/3692* (2013.01); *G06F 11/3684* (2013.01); *G06F 11/3688* (2013.01); *G06N 20/00* (2019.01)

(58) Field of Classification Search
CPC ............. G06F 11/3692; G06F 11/3684; G06F 11/3688; G06N 20/00
See application file for complete search history.

(56) References Cited

U.S. PATENT DOCUMENTS

| | | | | |
|---|---|---|---|---|
| 10,599,558 B1* | 3/2020 | Zana | ...................... | G06F 11/302 |
| 10,990,516 B1* | 4/2021 | Merritt | ................. | G06F 11/3692 |
| 2009/0307763 A1* | 12/2009 | Rawlins | .............. | G06F 11/2294 |
| | | | | 714/E11.002 |
| 2011/0296382 A1* | 12/2011 | Pasternak | ........... | G06F 11/3688 |
| | | | | 717/124 |
| 2018/0095861 A1* | 4/2018 | Fainekos | ............. | G06F 11/3604 |
| 2019/0370158 A1* | 12/2019 | Rivoir | ................. | G06F 11/3672 |
| 2021/0133084 A1* | 5/2021 | Ferguson | ........... | G06F 11/3688 |

OTHER PUBLICATIONS

Briand, Lionel C. "Novel applications of machine learning in software testing." 2008 The Eighth International Conference on Quality Software. IEEE, 2008. (Year: 2008).*
Perini, Anna, Angelo Susi, and Paolo Avesani. "A machine learning approach to software requirements prioritization." IEEE Transactions on Software Engineering 39.4 (2012): 445-461. (Year: 2012).*
Yoo, Shin, and Mark Harman. "Regression testing minimization, selection and prioritization: a survey." Software testing, verification and reliability 22.2 (2012): 67-120. (Year: 2012).*

* cited by examiner

*Primary Examiner* — Kevin L Young
*Assistant Examiner* — Joanne G Macasiano
(74) *Attorney, Agent, or Firm* — PEARL COHEN ZEDEK LATZER BARATZ LLP (57) ABSTRACT

A method for optimizing a verification regression includes obtaining data, by a processor, of previously executed runs of at least one verification regression session; extracting from the data, by the processor, values of one or a plurality of control knobs and values of one or a plurality verification metrics that were recorded during the execution for each of the previously executed runs of said at least one verification regression; finding, by the processor, correlation between said one or a plurality of the control knobs and each said one or a plurality of verification metrics, and generating a set of one or a plurality of control conditions based on the found correlation; and applying, by the processor, the generated set of one or a plurality of control conditions on the verification environment or on the DUT, or on both, to obtain a new verification regression session.

20 Claims, 5 Drawing Sheets

METHOD AND SYSTEM FOR OPTIMIZING A VERIFICATION TEST REGRESSION

FIELD OF THE INVENTION

The present invention relates to electronic design verification, and ore particularly to method and system for optimizing a verification test regression for testing a device under test and a corresponding verification environment.

BACKGROUND OF THE INVENTION

Verification can be a tedious task that may occupy a considerable amount of time of programmers. Specifically, a lot of time may be invested in locating faults (typically referred to as "bugs") in the program. Automatic fault localization techniques were introduced that are aimed at addressing this problem. For example, automatic fault localization may involve the use of coverage information.

When testing a code, the extent to which that code was actually tested—typically referred to as "coverage"—may be measured.

There can be various kinds of coverage metrics, like code coverage, functional coverage, etc. There can also be various verification engines with which coverage may be graded (e.g., simulation, emulation, formal).

Verification is a process of verifying that an electronic design conforms to the specification set by the designers of that electronic design. Typically, verification processes include conducting numerous test runs on the design under test (DUT) in various verification environments (e.g., test benches in simulations and constraint sets in formal verification scenarios), which may actually verify different design integration levels (modules in a system).

A verification process aimed at verifying the design of a DUT typically involves collecting verification data that may include verification metrics, such as, for example, verification data relating to coverage (e.g., code coverage, functional coverage etc.) of coverage entities in the DUT and/or to status (e.g., failed or passed) or of assertions relating to code of the DUT.

When testing a DUT, measuring the extent of coverage of that design during execution runs may provide valuable information. A "DUT" may refer to an electronic design, which may be implemented in software (e.g., as a verification model) which is used in verification of that DUT, or in hardware.

There are various kinds of verification metrics. For example, code coverage, (e.g., measures the percentage of code that was executed during execution runs) and/or functional coverage (e.g., measuring the percentage of functionalities pertaining to that code that were executed during execution runs, and/or status of assertions that are predicates relating to specific points in the code).

Code coverage is typically referred to as a metric that measures the extent at which the code lines were executed in the implementation of a design under test (DUT). There can be a number of other metrics associated with code coverage that electronic design automation (EDA) tools can measure, such as, for example, whether each code line has toggled to their true or false states.

Functional coverage can be referred to as a metric that measures the coverage of functionalities of the DUT.

Other metrics may include status of an assertion which may typically be "pass" (e.g., true), indicating that that assertion is correct or "fail" (e.g., false) if the assertion is incorrect.

In current systems, a DUT model that has a hierarchic structure may be used. The DUT model can be in the form of a tree, with coverage entities at its nodes. Some nodes can have children nodes. Some nodes can have no children. Nodes that have no children nodes can be referred to as "leaves".

At a base level of the tree are basic verification entities (e.g., bin, statement, assertion, bucket, block, etc.), which may typically be graded "1" (e.g., if covered in a certain run) or "0" (e.g., if uncovered). The grades of higher hierarchies are typically calculated using a roll-up calculation, so that, for example, a block with a plurality of coverage entities of which only 70 percent are covered may receive a coverage grade of 70%. The roll-up calculation may also be implemented with respect to higher hierarchies of the tree representing the DUT.

Typically, a DUT and its corresponding verification environment are subjected to multiple test runs that form a verification regression (also referred to as "regression" for brevity).

In many cases, regressions are not optimal with respect to verification targets (e.g., targets of which the verification specialist sets up to be achieved/measured by/through a regression., for example: a reaching a coverage point, achieving a predetermined coverage percentage, etc.). When considering a typical regression, in many cases a poor throughput with regards to the verification targets may be achieved (where throughput is the number of verification targets achieved per a CPU cycle/per run etc.) which may indicate the existence of redundancy. It may be desired to achieve same verification-targets by employing less computing resources.

Ranking may be used to optimize regression sessions. For example, a regression session may typically include a large number of runs (e.g., hundreds, thousands, tens of thousands, etc. of runs) A regression specialist may use ranking to find a subset of tests of a previously executed regression test (e.g., a smaller number of runs) that may achieve, when run, the same coverage of the entire regression set of tests.

While it is desired to maintain randomization in a regression session, random tests are typically expected to be repeatable. Repeatability may be necessary to reproduce failures, both for analysis and for debugging.

Ranking is typically a well-established way to minimize the number of runs/cost while keeping same coverage grade. Typically, coverage ranking takes one or a plurality of regressions, and picks a set of runs from a previously executed regression or regressions that together cover all cover-points that the previously executed regression (or regressions) had covered. This is typically a nondeterministic polynomial (NP) complete problem (set-cover), but a greedy algorithm may he used to obtain acceptable results.

Ranking is typically not random in its nature. A ranked set of tests is actually a set of directed tests. A ranked set of tests typically is unlikely to investigate new areas of the DUT and is unlikely to hit new cover-points or explore other parts of the verification space.

Ranking is typically very sensitive to changes in the verification environment. The randomness stability in ranking is typically very frail, so a seed that caused a test to reach a certain cover-point in a certain run, will not necessarily reach that same cover-point in another run. This is why in a sense one can think of ranking as analysis of past regressions, and it is not so clear how, if at all, it may successfully affect future regressions. To-date, ranking is typically targeted to explore coverage. Other verification targets that were not or cannot be expressed as coverage targets, cannot be ranked.

SUMMARY OF THE INVENTION

There is thus provided, according to some embodiments of the present invention, a method for optimizing a verification regression session for testing a device under test (DUT) in a corresponding verification environment. The method includes obtaining data, by a processor, of previously executed runs of at least one verification regression session.

The method also includes extracting from the data, by the processor, values of one or a plurality of control knobs and values of one or a plurality verification metrics that were recorded during the execution for each of the previously executed runs of said at least one verification regression.

The method also includes finding, by the processor, correlation between said one or a plurality of the control knobs and each said one or a plurality of verification metrics, and generating a set of one or a plurality of control conditions based on the found correlation, and applying, by the processor, the generated set of one or a plurality of control conditions on the verification environment or on the DUT, or on both, to obtain a new verification regression session.

According to some embodiments of the invention, the set of one or a plurality of control conditions includes selection or deselection of one or more tests that were executed in the previously executed runs of said at least one verification regression.

According to some embodiments of the invention, the set of one or a plurality of control conditions is selected from the group consisting of: constraints and distribution control.

According to some embodiments of the invention, the set of one or a plurality of control conditions comprises one or a plurality of control conditions that when applied on the verification environment or on the DUT, or on both are selected to cause the new verification test regression, when executed, to achieve one or a plurality of verification targets.

According to some embodiments of the invention, said one or a plurality of verification targets is selected from the group consisting of: hitting predetermined code, hitting predetermined one or more functional coverage items, achieving predetermined distribution of hits of code, achieving predetermined distribution of one or more functional coverage items and hitting a marginal code.

According to some embodiments of the invention, said one or a plurality of control knobs is selected from the group consisting of one or more entities of the DUT or the corresponding verification environment, one or more variables, selection or deselection of a specific portion of the DUT for testing.

According to some embodiments of the invention, finding of the correlation includes applying machine learning.

According to some embodiments of the invention, generating the set of one or a plurality of control conditions comprises using a stochastic set-cover algorithm.

According to some embodiments of the invention, there is provided a system for optimizing a verification regression session for testing a DUT in a corresponding verification environment, the system including memory and a processor configured to extract from data of previously executed runs of at least one verification regression session values of one or a plurality of control knobs and values of one or a plurality verification metrics that were recorded during the execution for each of the previously executed runs of said at least one verification regression, find correlation between said one or a plurality of the control knobs and each said one or a plurality of verification metrics, and generating a set of one or a plurality of control conditions based on the found correlation, and apply the generated set of one or a plurality of control conditions on the verification environment or on the DUT, or on both, to obtain a new verification regression session.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as is apparent from the following discussions, it is appreciated that throughout the specification, discussions utilizing terms such as "adding", "associating" "selecting," "evaluating," "processing,"

"computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

A regression session may involve running a plurality of different tests and/or running the same test but with different seeds or applying different conditions on the DUT or its corresponding verification environment. For brevity, hereinafter each run of a test, whether the same test with different seeds or a test in a series of different tests, or otherwise applying one or a plurality of control conditions on the DUT or its corresponding verification environment is referred to as a "run".

According to some embodiments of the invention, a method is proposed for optimizing a previously executed regression session to obtain a new regression that may offer some randomness and is likely to achieve same or better results for verification targets with respect to results of the verification targets obtained in the previously executed regression session.

According to some embodiments of the present invention, during the execution of at least one regression session (herein generally referred to as "previously executed regression") on a DUT and/or on its corresponding verification environment, an EDA tool may extract from data pertaining to the previously executed regression that was recorded, control knobs—e.g., entities of the DUT or the verification environment, such as, variables, selection or deselection of a specific test for inclusion in a regression, selection or deselection of specific units of the DUT for testing in a specific test, that are controllable (e.g., may be subjected to control conditions, e.g., constraints, selection or deselection, distribution control etc.). For example, a variable may be assigned different values in different runs during a regression, in which case distribution control may include controlling the distribution of different values for that variable. A control knob can get different values, as such a distribution of this variable across all the runs in regression can be controlled and set. In another example, there may exists a Boolean variable that is generated in each run, e.g., it may be assigned the values 0 or 1. A user may define the distribution of these values across all the runs in a regression to be, for example, by determining a distribution ratio (e.g., 10/90 so that 0 value will be generated 9 times more than the value 1).

In some embodiments of the invention an EDA tool may extract control knobs for each run of a previously executed verification session from recorded data of the previously executed verification session. regression. According to some embodiments of the invention, it may be desired to identify control knobs that are likely to be significant (e.g., more significant than other control knobs) in obtaining a specific result for one or a plurality of selected verification targets, e.g., desired values of one or a plurality of verification metrics for that DUT and corresponding verification environment for a given verification regression session.

Regression data, that may include, for example, values of the selected control knobs and the results of the various verification metrics (e.g., verification quality—VQ—metrics) may be recorded during the previously executed regression session and saved (e.g., in database). The recorded regression data may include the actual set of runs of the previously executed regression session, with the corresponding control knobs and related verification metrics results.

According to some embodiments of the invention, the EDA tool may extract specific verification metric or metrics from the data of a previously executed verification regression session.

According to some embodiments of the invention, machine learning technique or techniques may be used, for analysing the saved regression data and learning to predict what subset of tests of the previously executed regression may achieve same or better results per given or selected verification targets.

According to some embodiments of the invention, a user may define verification target or targets, for example, by selecting target values for specific verification metric or metrics of interest from the regression data. Such regression targets may include coverage, latency, etc. In some embodiments of the invention, the EDA tool may automatically define verification targets.

According to some embodiments a machine learning engine may apply machine learning technique or techniques to find a correlation between the control knobs and the verification targets, and based on the discovered correlation generate control conditions to be applied on the DUT or the corresponding verification environment, or both so as to obtain a new regression session (complying with the control conditions) that may be predicted to obtain the same or better results for selected verification target or targets, according to some embodiments of the invention.

The generated control conditions may be applied on the DUT or corresponding verification environment. A simulator backdoor mechanism may apply the generated control conditions over selected runs of the previously executed regression session.

According to some embodiments of the present invention, the EDA tool may employ machine learning technique/s on data of previously executed verification regression session to find correlation between control knobs and verification targets and identify control knobs that may be significant in obtaining desired verification targets.

Applying the generated control conditions on the DUT and/or the corresponding verification environment creates a new regression session (a "new regression"), maintaining randomness, and has a potential to be able to reach a verification target that was not reached in the previously executed regression or obtain a same or better result with less tests and/or seeds, or other control conditions.

The sensitivity of the new regression to design changes is typically lower than the sensitivity to design changes in a regression generated by applying ranking. Generally, control knobs are less affected by design changes, although they still may be affected.

Figure 1:
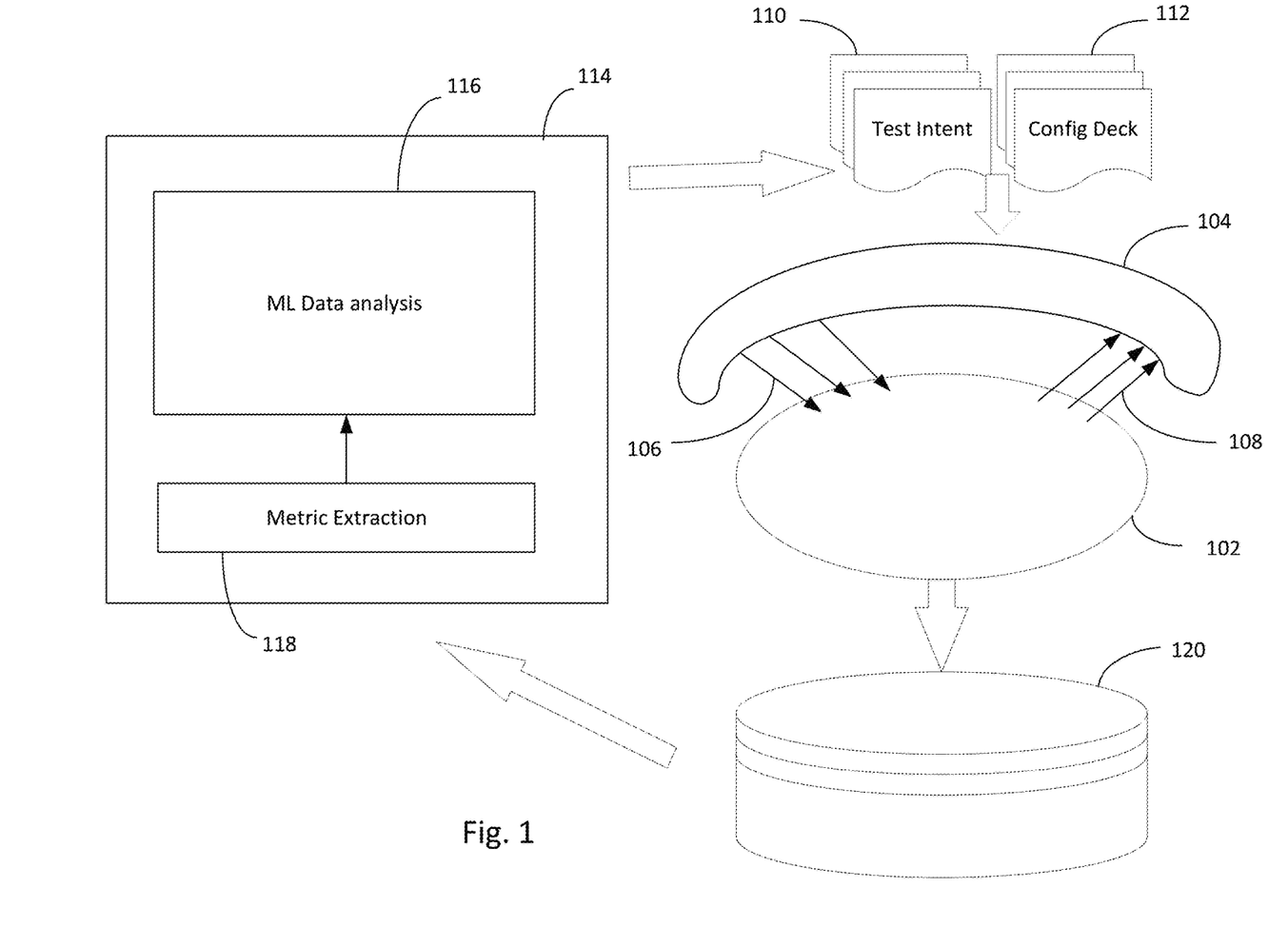
FIG. 1 is a block diagram of a method for optimizing a verification test regression for testing a DUT and a corresponding verification environment, according to some embodiments of the invention.

FIG. 1 is a block diagram of a method for optimizing a verification regression session for testing a DUT and a corresponding verification environment, according to some embodiments of the invention.

A verification regression may be executed on a DUT and a corresponding verification environment, e g., a constrained random verification environment (testbench) 104, that injects inputs 106 into a DUT 102 and receives outputs 108. The regression data, including the executed tests and values of corresponding variables, other control knobs, and other execution events, per each run, may be recorded and saved in database 120.

The saved regression data may be read by a EDA tool 114 that includes metric extraction module 118 for extracting values of one or a plurality of control knobs and values of one or a plurality verification metrics that were recorded during the runs of said at least one verification regression session from the saved regression data. For example, if the extracted values relate to coverage, a coverage engine incorporated in the EDA tool may extract the coverage metrics. In another example, the values to be extracted relate to a user defined control knob or knobs. In a case of a user defined control knob, a user may write a script to extract the values from the recorded data (e.g., execution information, such as a log file). A correlation finder engine, e.g., machine learning (ML) data analysis engine 116 may find correlation between control knobs and verification metrics, e.g., by applying machine learning technique/s.

The EDA tool may use the found correlation (e.g., obtained by ML analysis) to generate a set of one or a plurality of control conditions based on the found correlation; and apply the generated set of one or a plurality of control conditions on the verification environment or on the DUT, or on both, to obtain a new verification regression session.

The control conditions may include, for example, selection or deselection of one or more tests that were executed in the previously executed runs of said at least one verification regression, constraints (e.g., test intent, config deck) and distribution control, which are likely to substantially regain the verification target or targets of the previously executed regression and yet save computing resources and shorten regression time.

By obtaining the new regression based on a previously executed regression and finding correlation between one or a plurality of the control knobs and each one or a plurality of verification metrics, e.g., by applying one or a plurality of machine learning techniques, the new regression may maintain randomness while regaining same or even better results for verification target or targets, and at the same time using less (in some cases even considerably less) computing resources.

According to some embodiments of the present invention a verification target that may be obtained is an improvement in verification throughput by regaining verification targets using less computing resources.

Verification throughput may be defined, according to some embodiments of the invention, as

[0062]
$$T = \frac{VQ}{\# \text{ runs}}, \quad (1)$$

where T is the throughput, VQ is a verification target (e.g., verification quality) achieved and #runs is the number of regression runs that were executed to obtain that VQ.

Alternatively, verification throughput may be calculated by:

[0064]
$$T = \frac{VQ}{\# CPU}, \quad (2)$$

where VQ is the verification target achieved and #CPU is the number of CPU clock cycles that were required to cover that VQ.

Figure 2:
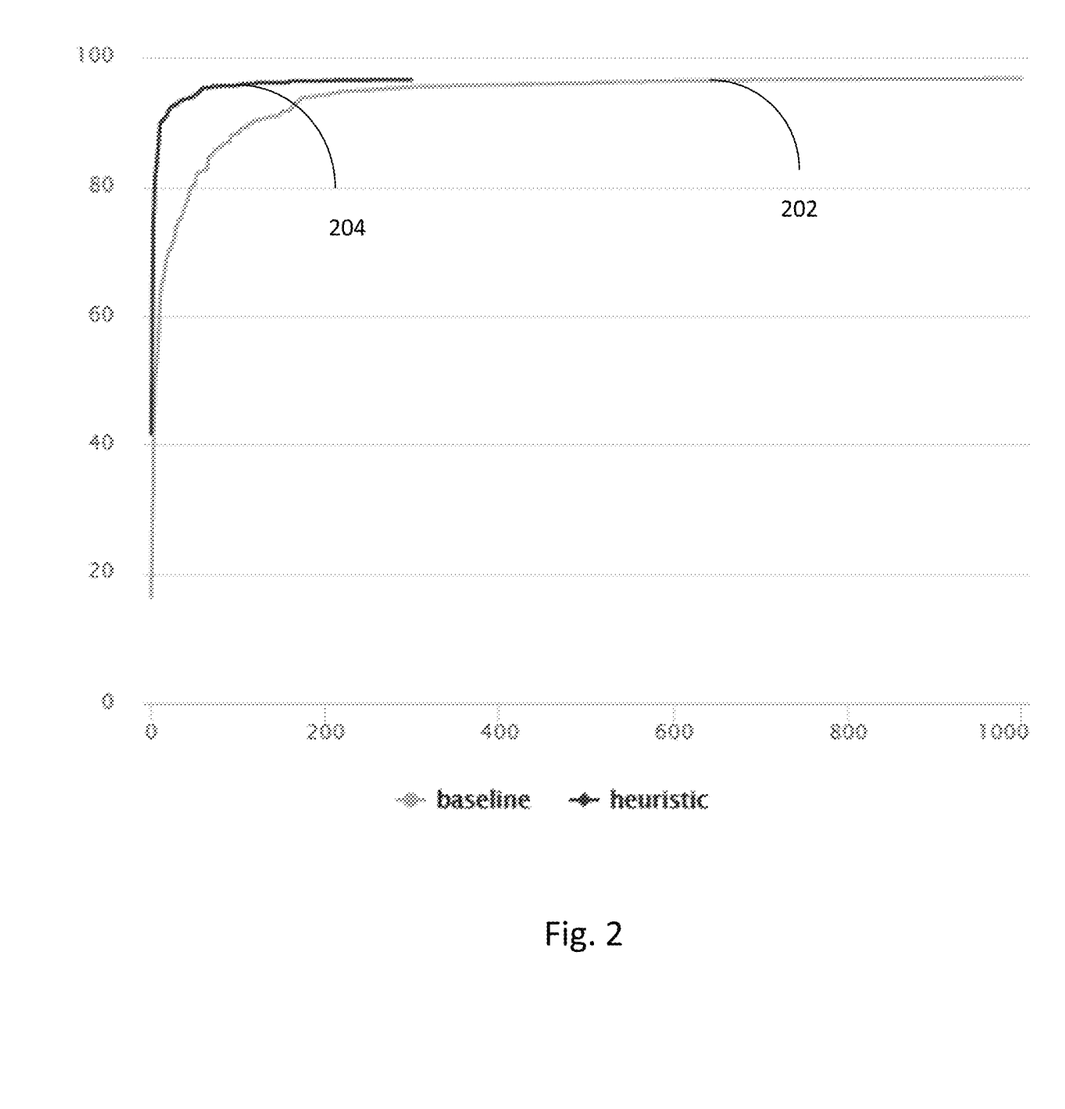
FIG. 2 is a graph showing coverage grade (an example of verification—target, in this case a verification quality—VQ) per number of test runs obtained for a DUT comparing a baseline regression that includes 1000 tests and a regained subset of regression tests obtained in accordance with some embodiments of the present invention.

FIG. 2 is a graph showing coverage grade (an example of verification target) per number of test runs obtained for a specific DUT comparing a baseline regression 202 that was performed on the DUT and its corresponding verification environment by executing a new regression 204 obtained in accordance with some embodiments of the present invention and executed on the same DUT and corresponding environment.

Baseline regression 202 (the previously executed regression session) in this example included 1000 test runs. The coverage grade (e.g., a result of a verification target) obtained was 96.7% (for functional coverage). Simulation time used to reach that coverage grade was 36,530 seconds, or 54.3 Tera CPU clock cycles. The new regression generated in accordance with some embodiments of the present invention only included 300 runs and reached a functional coverage grade of 96.6% after simulation time of 17,536 seconds or 24.8 Tera clock cycles. The new regression achieved 10 new hits of coverage points but failed to hit 25 other coverage points that were hit in the baseline regression. Nevertheless, the time it took to obtain practically the same coverage grade was less than half the time it took for the baseline regression to achieve similar coverage grade, and for less than half the clock cycles.

Figure 3:
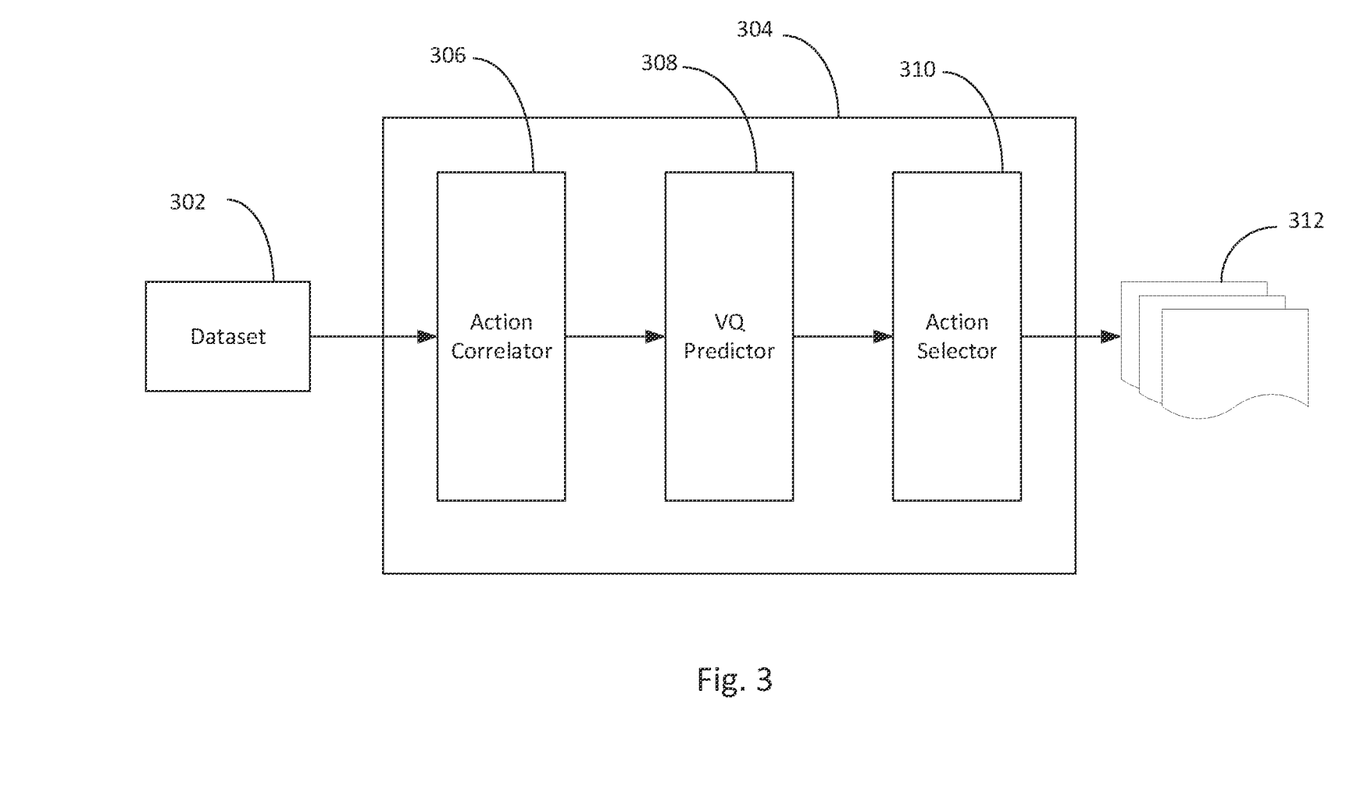
FIG. 3 is a block diagram of a machine learning module to obtain a new verification test regression from a previously executed verification test regression, according to some embodiments of the invention.

FIG. 3 is a block diagram of a machine learning module to obtain a new verification test regression from a previously executed verification test regression, according to some embodiments of the invention.

A machine learning approach, according to some embodiments of the present invention may utilize a ML, module 304 that includes action correlator 36, VQ predictor 308 and action selector 310. Dataset 302 of VQ and control knobs values per each test of a previously executed regression may be provided to action correlator 306, that may apply mathematical network techniques (e.g., Bayesian network, neural network) and generate a model for correlating the control knobs to VQs per each test and identify candidate constraints that would steer the runs to reach desired verification target or targets, e.g., a predetermined coverage) for the control knobs. VQ predictor 308 may, using the mathematical technique (e.g., Bayesian network, neural network) calculate the probability P(bin/candidate) for all VQ bins and all candidate constraints. Action selector 310 may apply a stochastic set-cover algorithm to generate a set of one or a plurality of control conditions using a stochastic set-cover algorithm.

The generated set of one or a plurality of control conditions may be then applied on the verification environment or on the DUT, or on both, to obtain a new verification regression session.

Figure 4:
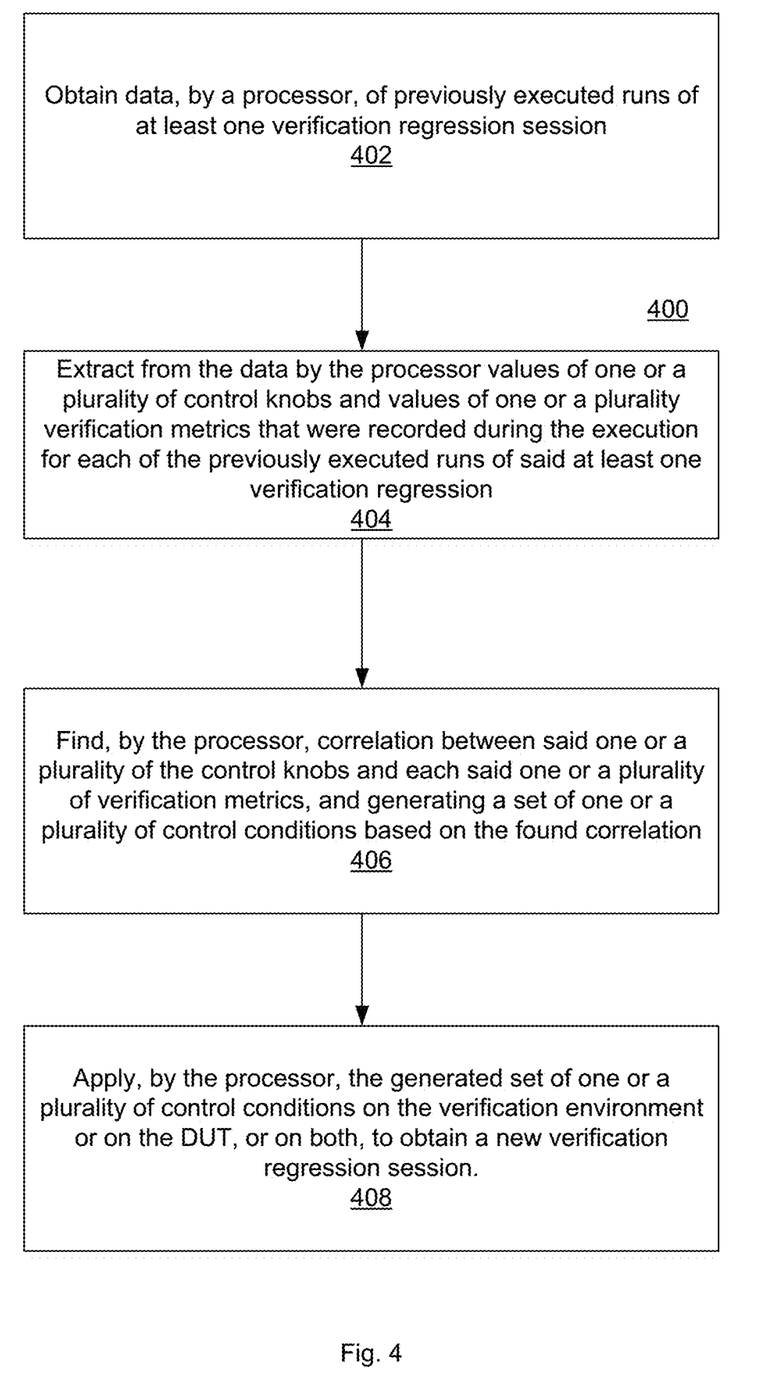
FIG. 4 illustrates a method for optimizing a verification test regression for testing a DUT and a corresponding verification environment, according to some embodiments of the invention.

FIG. 4 illustrates a method for optimizing a verification test regression for testing a DUT and a corresponding verification environment, according to some embodiments of the invention.

Method 400 may include obtaining 402 data, by a processor, of previous executed at least one verification regression session.

Method 400 may also include extracting 404 from the data, by the processor, values of one or a plurality of control knobs and values of one or a plurality verification metrics that were recorded during the execution for each of the previously executed runs of said at least one verification regression.

Method 400 may also include finding 406, by the processor, correlation between said one or a plurality of the control knobs and each said one or a plurality of verification metrics, and generating a set of one or a plurality of control conditions based on the found correlation.

Method 400 may also include applying 408, by the processor, the generated set of one or a plurality of control conditions on the verification environment or on the DUT, or on both to obtain a new verification regression session.

In some embodiments of the invention the method may include executing the new verification regression session on the DUT and corresponding verification environment.

In some embodiments of the present invention, the set of one or a plurality of control conditions includes selection or deselection of one or more tests that were executed in the previously executed runs of said at least one verification regression.

In some embodiments of the present invention, the set of one or a plurality of control conditions is selected from the group consisting of: constraints, variable constraints and distribution constraints, which, in some embodiments, may be applied on possible values of the control knobs.

In some embodiments of the present invention, the set of one or a plurality of control conditions comprises one or a plurality of control conditions that when applied on the verification environment or on the DUT, or on both are selected to cause the new verification test regression, when executed, to achieve one or a plurality of verification targets.

In some embodiments of the present invention, the one or a plurality of verification targets is selected from the group consisting of: hitting predetermined code, hitting predetermined one or more functional coverage items, achieving predetermined distribution of hits of code, achieving predetermined distribution of one or more functional coverage items, hitting a marginal code, and achieving improvement in verification throughput.

In some embodiments of the present invention, said one or a plurality of control knobs is selected from the group consisting of one or more controllable entities of the DUT or variables of the corresponding verification environment the values of which can be configured or randomized, selection or deselection of a specific portion of the DUT for testing.

In some embodiments of the present invention, finding of the correlation comprises applying machine learning technique.

In some embodiments of the present invention, generating the set of one or a plurality of control conditions comprises using a stochastic set-cover algorithm.

Figure 5:
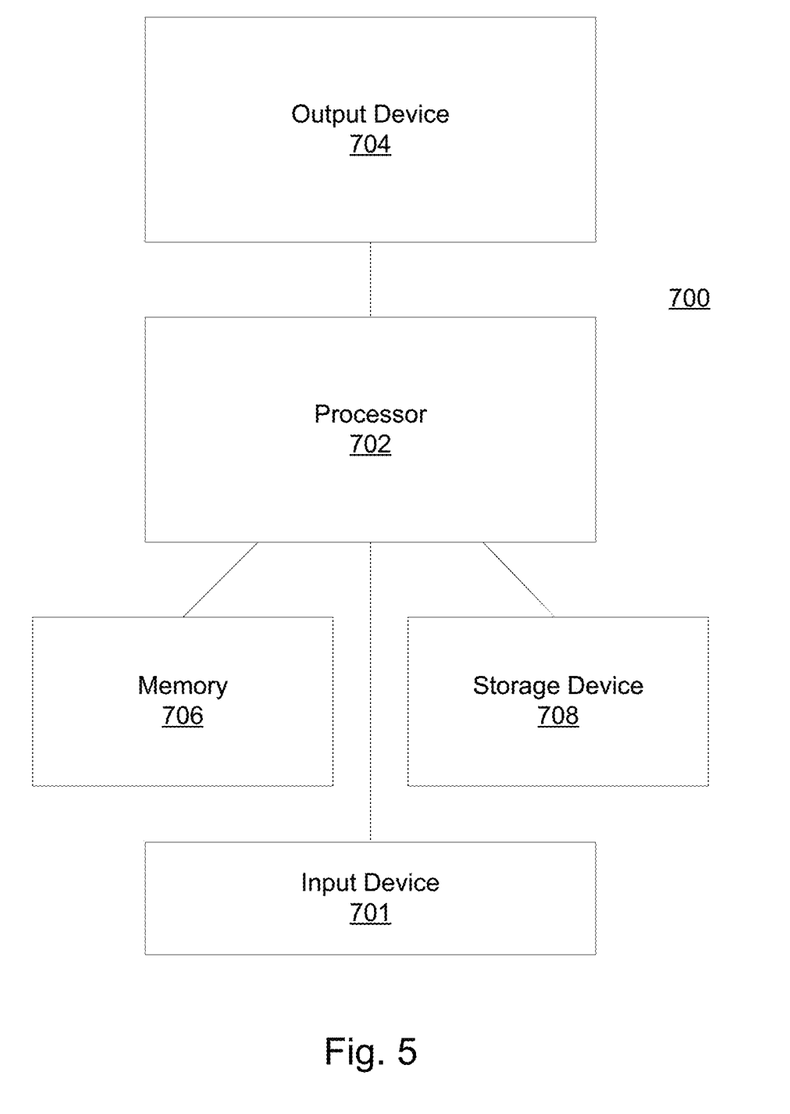
FIG. 5 illustrates a system for optimizing a verification test regression for testing a DUT and a corresponding verification environment, according to some embodiments of the invention.

FIG. 5 illustrates a system for optimizing a verification test regression for testing a DUT and a corresponding verification environment, according to some embodiments of the invention.

System 700 may include a processor 702 (e.g. one or a plurality of processors, on a single machine or distributed on a plurality of machines) for executing a method according to some embodiments of the present invention. Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g. display device such as CRT, LCD, LED etc.) on which one or a plurality user interfaces associated with a program implementing a method according to some embodiments and corresponding data may be presented. System 700 may also include input device 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and be executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for optimizing a verification regression session for testing a device under test (DUT) in a corresponding verification environment, the method comprising:

obtaining data, by a processor, of previously executed runs of at least one verification regression session;

extracting from the data, by the processor, values of one or a plurality of control knobs selected from the group consisting of: selection or deselection of a specific test for inclusion in a regression, selection or deselection of specific units of the DUT for testing in a specific test and a controllable entity of the DUT or a testing environment of the DUT to be subjected to control conditions and values of one or a plurality of verification metrics that were recorded during the execution for each of the previously executed runs of said at least one verification regression session;

finding, by the processor, correlation between said one or a plurality of the control knobs and each said one or a plurality of verification metrics;

generating a set of one or a plurality of control conditions based on the found correlation; and applying, by the processor, the generated set of one or a plurality of control conditions on the verification environment or on the DUT, or on both, to obtain a new verification regression session.

2. The method of claim 1, wherein said set of one or a plurality of control conditions comprises selection or deselection of one or more tests that were executed in the previously executed runs of said at least one verification regression session.

3. The method of claim 1, wherein said set of one or a plurality of control conditions is selected from the group consisting of: constraints, variable constraints and distribution constraints.

4. The method of claim 1, wherein the set of one or a plurality of control conditions comprises one or a plurality of control conditions that when applied on the verification environment or on the DUT, or on both are selected to cause the new verification regression session, when executed, to achieve one or a plurality of verification targets.

5. The method of claim 4, wherein said one or a plurality of verification targets is selected from the group consisting of: hitting predetermined code, hitting predetermined one or more functional coverage items, achieving predetermined distribution of hits of code, achieving predetermined distribution of one or more functional coverage items, hitting a marginal code, and achieving improvement in verification throughput.

6. The method of claim 1, wherein said one or a plurality of control knobs is selected from the group consisting of one or more controllable entities of the DUT or variables of the corresponding verification environment the values of which can be configured or randomized, selection or deselection of a specific portion of the DUT for testing.

7. The method of claim 1, wherein finding of the correlation comprises applying machine learning technique.

8. The method of claim 1, wherein generating the set of one or a plurality of control conditions comprises using a stochastic set-cover algorithm.

9. A system for optimizing a verification regression session for testing a DUT in a corresponding verification environment, the system comprising:
a memory; and
a processor configured to:
extract from data of previously executed runs of at least one verification regression session values of one or a plurality of control knobs selected from the group consisting of: selection or deselection of a specific test for inclusion in a regression, selection or deselection of specific units of the DUT for testing in a specific test and a controllable entity of the DUT or a testing environment of the DUT to be subjected to control conditions and values of one or a plurality of verification metrics that were recorded during the execution for each of the previously executed runs of said at least one verification regression session;
find correlation between said one or a plurality of the control knobs and each said one or a plurality of verification metrics, and generating a set of one or a plurality of control conditions based on the found correlation; and
apply the generated set of one or a plurality of control conditions on the verification environment or on the DUT, or on both, to obtain a new verification regression session.

10. The system of claim 9, wherein said set of one or a plurality of control conditions comprises selection or deselection of one or more tests that were executed in the previously executed runs of said at least one verification regression session.

11. The system of claim 9, wherein said set of one or a plurality of control conditions is selected from the group consisting of: constraints, variable constraints and distribution constraints.

12. The system of claim 9, wherein the set of one or a plurality of control conditions is selected so that when applied on the verification environment or on the DUT, or on both causes the new verification regression session to achieve one or a plurality of predetermined verification targets.

13. The system of claim 12, wherein said one or a plurality of verification targets is selected from the group consisting of: hitting predetermined code, hitting predetermined one or more functional coverage items, achieving predetermined distribution of hits of code, achieving predetermined distribution of one or more functional coverage items and hitting a marginal code, and achieving improvement in verification throughput.

14. The system of claim 9, wherein said one or a plurality of control knobs is selected from the group consisting of one or more controllable entities of the DUT or variables of the corresponding verification environment the values of which can be configured or randomized, selection or deselection of a specific portion of the DUT for testing.

15. The system of claim 9, wherein, to find the correlation, the processor is configured to apply machine learning.

16. The system of claim 9, wherein, to generate the set of one or a plurality of control conditions the processor is configured to use a stochastic set-cover algorithm.

17. A non-transitory computer readable storage medium for optimizing a verification regression session for testing a DUT in a corresponding verification environment, having stored thereon instructions that when executed by a processor will cause the processor to:
extract from data of previously executed runs of at least one verification regression session values of one or a plurality of control knobs selected from the group consisting of: selection or deselection of a specific test for inclusion in a regression, selection or deselection of specific units of the DUT for testing in a specific test and a controllable entity of the DUT or a testing environment of the DUT to be subjected to control conditions and values of one or a plurality of verification metrics that were recorded during the execution for each of the previously executed runs of said at least one verification regression session;
find correlation between said one or a plurality of the control knobs and each said one or a plurality of verification metrics, and generating a set of one or a plurality of control conditions based on the found correlation; and
apply the generated set of one or a plurality of control conditions on the verification environment or on the DUT, or on both, to obtain a new verification regression session,
wherein the set of one or a plurality of control conditions is selected so that when applied on the verification environment or on the DUT, or on both causes the new verification regression session to achieve one or a plurality of predetermined verification targets.

18. The non-transitory computer readable storage medium of claim 17, wherein said set of one or a plurality of control conditions comprises selection or deselection of one or more tests that were executed in the previously executed runs of said at least one verification regression session.

19. The non-transitory computer readable storage medium of claim 17, wherein said set of one or a plurality of control conditions is selected from the group consisting of: constraints, variable constraints and distribution constraints.

20. The non-transitory computer readable storage medium of claim 17, having stored thereon instructions that when executed by a processor will cause the processor to generate the set of one or a plurality of control conditions the processor using a stochastic set-cover algorithm.

\* \* \* \* \*